United States Patent Office 3,637,722
Patented Jan. 25, 1972

3,637,722
HALOGENATED-4-HYDROXY-6-METHYL-
2(1H)PYRIDONES
Chun-shan Wang and Thomas W. McGee, Midland, Mich.,
assignors to The Dow Chemical Company, Midland,
Mich.
No Drawing. Filed Mar. 17, 1969, Ser. No. 807,962
Int. Cl. C07d 31/30
U.S. Cl. 260—297 Z
3 Claims

ABSTRACT OF THE DISCLOSURE

The invention relates to halogenated-4-hydroxy-6-methyl-2(1H)pyridones of the formula

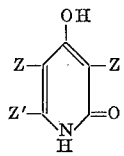

wherein each Z is hydrogen or X; X is chlorine, bromine or iodine; and Z' is —CH$_3$, —CH$_2$X, —CHX$_2$ or —CX$_3$. The compounds of the invention are particularly useful as insecticides and fungicides.

SUMMARY OF THE INVENTION

The present invention is directed to halogenated 4-hydroxy-6-methyl-2(1H)pyridone compounds and is particularly directed to halogenated-4-hydroxy-6-methyl-2(1H) pyridone compounds corresponding to the formula

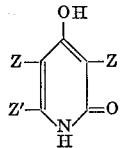

wherein Z is hydrogen or X; X is chlorine, bromine or iodine; and Z' is —CH$_3$, —CH$_2$X, —CHX$_2$ or —CX$_3$. Compounds wherein X is chlorine in the above and succeeding formulae represent preferred compounds of the invention.

The products of the present invention are normally white needles or pink crystalline solids soluble in various organic solvents and of low solubility in water. Water solubility of the compounds increases with the increase in halogen content of the compound. The novel products are useful as insecticides, fungicides and as starting materials for the preparation of 1,2-dihydro-6-methyl-2-oxo-4-pyridyl and 6-methyl-2,4-pyridinediyl esters of benzenesulfonic acid, disclosed in application, Ser. No. 807,961, for "4-Pyridyl and 2,4-Pyridinediyl Benzenesulfonates" by Wang and McGee, filed Mar. 17,1969, of even date, which is further identified by attorney's docket number C-13,964.

In general, the compounds of the invention are prepared by reacting a predetermined halogen with 4-hydroxy-6-methyl-2(1H)pyridone. The reaction conveniently is carried out in the presence of an inert liquid reaction medium. Use of the inert liquid carrier is not critical but it is preferred since it provides for better dispersion and contacting of the reactants. Representative suitable inert liquids include, for example, ethanol, methanol, water or aqueous mixtures of these alcohols. Preferably, water is employed as the inert liquid reaction medium.

The reaction of 4-hydroxy-6-methyl-2(1H)-pyridone reactant and halogen is carried out at a temperature range of from about 10° to about 40° C. and is preferably conducted at about 25° C. The reaction goes forward under pressures of a wide range; however, no particular advantage ordinarily results from the use of subatmospheric or superatmospheric pressures, and therefore, the preparation is ordinarily carried out at atmospheric pressure.

The amounts of the reactants to be employed are not critical, some of any of the desired products being formed when employing these in any proportions. However, the reaction consumes the reactants in the proportion of one mole of 4-hydroxy-6-methyl-2(1H)pyridone to one mole of halogen for each halo radical represented by X in the compounds of the invention. Ordinarily, the aromatic ring carbons are halogenated first, followed by the methyl group, as halogen is introduced into contact with the pyridone under the reaction conditions. A suitable range for the ratio of reactants is 1:1 to 1:5 (4-hydroxy-6-methyl-2(1H)pyridone:halogen) depending on the degree of halogenation desired in the final product.

In carrying out the process, the pyridone compound reactant ordinarily is suspended in water with stirring. Chlorine gas is bubbled through the solution, bromine is added dropwise with vigorous stirring, or an aqueous hydrochloric acid solution of iodomonochloride is added to the suspension at a predetermined reaction temperature within the range as set forth hereinabove. After a predetermined amount of halogen is absorbed to provide a given degree of halogenation, the solid and liquid contents of the reactor are separated as by filtration, and the solid product ordinarily is washed with water.

If desired, the residual liquid portion of the reaction mixture can be treated to recover additional product therefrom. To illustrate, the filtrate can be concentrated as by heating, flash evaporation or the like.

The halo-substituted pyridone product of the present invention can be employed directly. If desired, however, the product can be further purified by conventional procedures before being used. Representative purification procedures include washing with an appropriate liquid which is a solvent for impurities but not for the product, recrystallization and the like.

DESCRIPTION OF THE PREFERRED EMBODIMENTS

The following examples further illustrate the present invention but are not to be construed as limiting the same.

EXAMPLE 1.—3-CHLORO-4-HYDROXY-6-METHYL-2(1H)PYRIDONE

4 - hydroxy - 6 - methyl-2(1H)pyridone (25 grams; 0.2 mole) is suspended in 287 milliliters of water with stirring. Chlorine gas is bubbled through this solution at 10° C. After 14.2 grams (0.2 mole) of chlorine has been absorbed, the contents of the flask are filtered and the filter cake is washed with 50 milliliters of cold water. The yellow solids are collected and recrystallized from an ethanol-acetone mixture. Ethanol-insoluble solids which consist mostly of unreacted starting material are discarded and the filtrate is concentrated by heating. Upon cooling, the filtrate yields yellow needles. Two recrystallizations from an acetone-ethanol mixture followed by activated carbon adsorption treatment give white crystalline needles melting at temperatures in excess of 300° C. Mass spectral analysis and NMR spectra support the proposed structure. Elemental analysis showed: C, 45.3 percent; H, 3.61 percent; N, 8.7 percent; Cl, 22.2 percent; calculated for

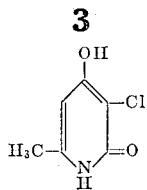

C, 45.14 percent; H, 3.76 percent; N, 8.77 percent; Cl, 22.25 percent.

EXAMPLE 2.—3,5-DICHLORO-4-HYDROXY-6-METHYL-2(1H)PYRIDONE

4 - hydroxy - 6 - methyl-2(1H)pyridone (25 grams; 0.2 mole) is suspended in 287 milliliters of water with stirring. Chlorine gas is bubbled through this solution at 10° C. After 28.4 grams (0.4 mole) of chlorine has been absorbed, the contents of the flask are filtered and the filtrate is concentrated on a rotary evaporator under reduced pressure to 150 milliliters. Yellow crystals deposit out upon cooling the concentrate. The crude product is recrystallized from an ethanol-acetone mixture to give white needles melting at from 250°–252° C. Mass spectral data is consistent with a molecular weight of 193 and NMR spectra support the proposed structure. Elemental analysis showed: C, 37.1 percent; H, 2.81 percent; Cl, 36.5 percent; calculated for

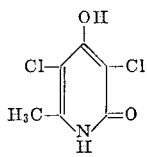

C, 37.11 percent; H, 2.58 percent; Cl, 36.6 percent.

EXAMPLE 3.—3,5-DICHLORO-4-HYDROXY-6-CHLOROMETHYL-2(1H)-PYRIDONE

4 - hydroxy - 6 - methyl-2(1H)pyridone (25 grams; 0.2 mole) is suspended in 287 milliliters of water with stirring. Chlorine gas is bubbled through this solution at 40° C. After approximately one hour, all the starting materials were dissolved and a clear solution is obtained. The reaction is slightly exothermic so that no external heating is required to keep the mixture at 40° C. The completion of the reaction is checked by chlorine consumption and the gain in weight of the flask. After 42.5 grams (0.6 mole) of chlorine is consumed, the reactor is allowed to cool 10 to 24 hours. The precipitated yellow solid is filtered and dissolved in ethanol with activated carbon adsorption treatment. The ethanol solution is concentrated and the addition of water causes the formation of yellow crystals. Two more recrystallizations from the ethanol-water mixture give pink crystals melting at from 165°–170° C. Mass spectral analysis is consistent with a molecular weight of 227, and infrared and NMR spectra support a chloromethyl rather than a methyl group at the Z′ position as illustrated in the generic formula.

In view of the foregoing teachings and examples, those skilled in the art will be enabled to prepare all of the products of the present invention. Other representative products are set forth in the following examples.

4-hydroxy-6-methyl-2(1H)pyridone (one molar equivalent is reacted with chlorine (4 molar equivalents) to provide 3,5 - dichloro - 4-hydroxy-6-dichloromethyl-2(1H)-pyridone having a molecular weight of 262.93.

4-hydroxy-6-methyl-2(1H)pyridone (one molar equivalent) is reacted with chlorine (five molar equivalents) to provide 3,5-dichloro-4-hydroxy-6-trichloromethyl-2(1H) pyridone having a molecular weight of 297.38.

EXAMPLE 4.—3,5-DIBROMO-4-HYDROXY-6-METHYL-2(1H)PYRIDONE 4-hydroxy-6-methyl-2(1H)pyridone (12.5 grams; 0.1 mole) is dissolved in 250 milliliters of glacial acetic acid. To this mixture, 32 grams (0.2 mole) of bromine is added dropwise with vigorous stirring. The reaction is slightly exothermic. After the addition of bromine is complete, the mixture is heated at 45° C. for about three hours and cooled for about 10 to 12 hours. The solids are filtered, washed with cold water and then recrystallized from hot acetic acid to give white needles in almost quantitative yield. The 3,5 - dibromo - 4-hydroxy-6-methyl-2(1H)pyridone product melts at from 225°–226° C. It is slightly soluble in acetone and glacial acetic acid but almost insoluble in water.

By following the procedural steps of Example 4, other bromo and iodo substituted 4-hydroxy-6-halomethyl-2-(1H)pyridone compounds of the present invention are obtained by using a predetermined mole ratio of starting pyridone reactant to bromine or iodomonochloride as hereinbefore set forth.

The products of the present invention are useful as pesticides for the control of a wide variety of fungal, bacterial and insect pests such as, for example, *Bacillus subtilis*, *Aspergillus terreus*, *Staphylococcus aureus*, *Pseudomonas aeruginosa*, *Candida albicans*, house fly and southern army worm. The 3,5-dichloro-6-chloromethyl derivative is found to exhibit outstanding selective herbicidal activity on pig weeds. For any of these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 200 to about 500 parts per million of one or more of the compounds.

In representative operations, each of 3-chloro-4-hydroxy-6-methyl-2(1H)pyridone and 3,5-dichloro-6-(chloromethyl)-4-hydroxy-2(1H)pyridone gives complete control and kill of the organisms *Trichophyton mentagrophytes*, *Bacillus subtilis* and *Candida pelliculosa* when one of the named compounds is separately applied to the environments containing and supporting thriving members of one of such organisms at a concentration of 500 parts per million by weight.

In further representative operations, 3-chloro-4-hydroxy-6-methyl-2(1H)pyridone gives substantially complete control and kill of *Pseudomonas aeruginosa*, *Staphylococcus aureus*, *Candida albicans*, *Aspergillus terreus*, *Pullularia pullulans*, acid fast bacterium and *Rhizopus nigricans* when such are contacted with solutions containing the named compounds at a concentration of 500 parts per million by weight.

In additional operations, 3-chloro-4-hydroxy-6-methyl-2(1H)pyridone, 3,5-dichloro-4-hydroxy-6-methyl-2(1H) pyridone and 3,5-dichloro-6-(chloromethyl)-4-hydroxy-2(1H)pyridone have a selective pre-emergence herbicidal effect on pigweeds in the presence of peas, radishes, winter wheat and oats when, soon after the seeds have been planted, an aqueous solution or dispersion of the chemical is poured on the soil in an amount which gives a rate of 10 pounds per acre.

In further additional operations, 3-chloro-4-hydroxy-6-methyl-2(1H)pyridone gives complete control of house fly larvae on fecal material collected from chicks fed a standard poultry diet containing the compound at a concentration of 500 parts per million by weight.

As indicated hereinbefore, the starting materials used in the synthesis of the halogenated pyridone compounds of this invention are a halogen and 4-hydroxy-6-methyl-2(1H)pyridone. The latter compound can be prepared readily in nearly quantitative yield by refluxing dehydroacetic acid in an aqueous 90 percent sulfuric acid solution at 130° C. The resulting 2,4-dioxo-6-methylpyrone is then dissolved in strong aqueous ammonia and heated at 100° C. to separate the crystalline 4-hydroxy-6-methyl-2(1H) pyridone. The preparation of this starting material is represented by the following equations:

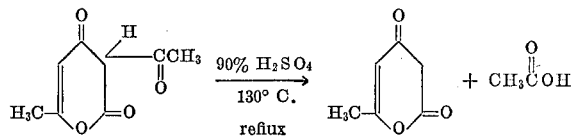

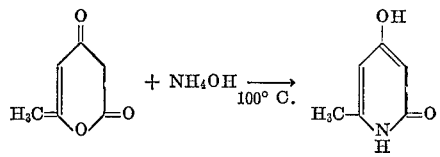

Various modifications can be made in the present invention without departing from the spirit or scope thereof for it is understood that we limit ourselves only as defined in the appended claims.

What is claimed is:
1. 3,5 - dichloro-4-hydroxy-6-chloromethyl-2(1H)pyridone.
2. 3,5-dichloro-4-hydroxy - 6 - dichloromethyl-2(1H) pyridone.
3. 3,5-dichloro-4-hydroxy - 6 - trichloromethyl-2(1H) pyridone.

References Cited
UNITED STATES PATENTS
3,355,278    11/1967    Weil et al. _____ 260—297

ALAN L. ROTMAN, Primary Examiner

U.S. Cl. X.R.
260—343.5, 999